May 11, 1965  A. D. SMITH  3,182,345
MEANS FOR ATTACHING APPLIANCE HANDLES TO A POWER DRIVE SHANK
Filed May 17, 1963
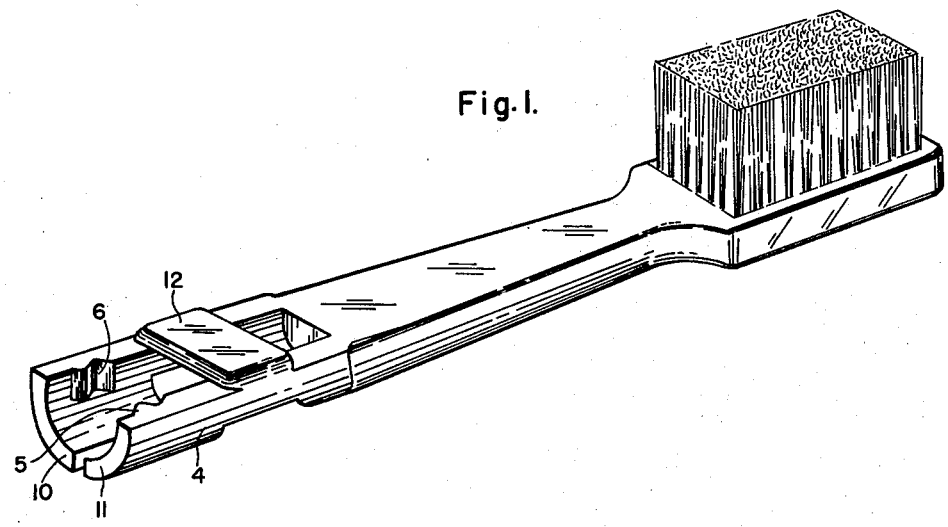
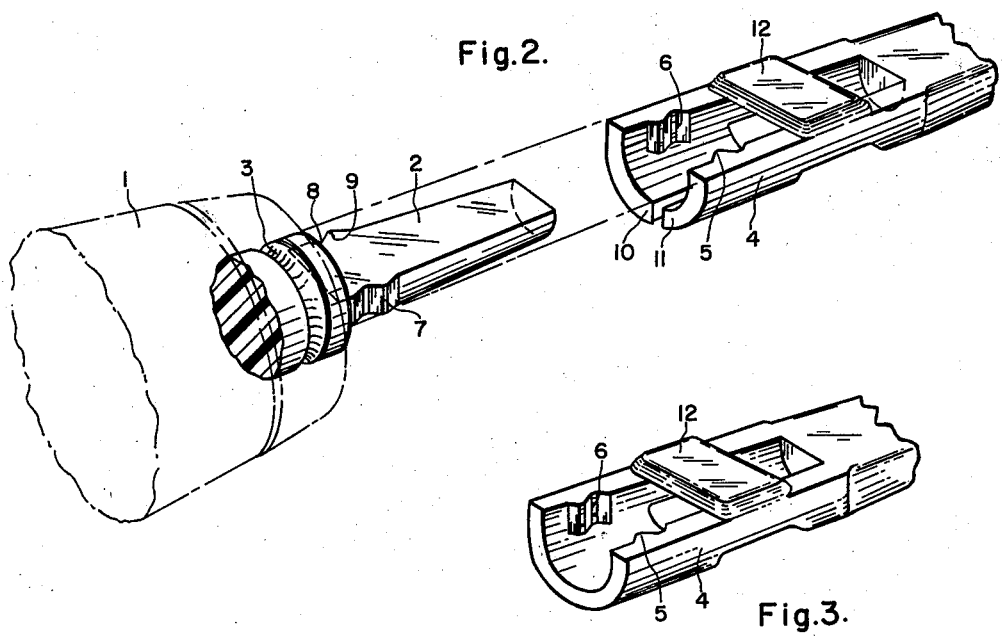
WITNESSES
Theodore F. Wrobel
James L. Young
INVENTOR
ALAN D. SMITH
BY
Robert T. French
ATTORNEY

United States Patent Office 3,182,345
Patented May 11, 1965

3,182,345
MEANS FOR ATTACHING APPLIANCE HANDLES TO A POWER DRIVE SHANK
Alan D. Smith, Mansfield, Ohio, assignor to Westinghouse Electric Corporation, Pittsburgh, Pa., a corporation of Pennsylvania
Filed May 17, 1963, Ser. No. 281,264
2 Claims. (Cl. 15—176)

This invention relates to attachment means and is of particular use for providing snap-on means for securing a variety of appliances to the power drive shank of a handle such, by way of example, as the attachment of toothbrushes to the shank of a handle which houses means to vibrate the said shank by giving it a movement particularly appropriate for a toothbrush.

An object of the invention is to provide snap-on means which will yield to gentle pressure or strain yet will provide positive means to lock an appliance to a power drive shank and which will not give way and release the said appliance during use.

The present invention is embodied in a shank having a unique shape and correspondingly recessed handles of devices to be snapped on to said shank whereby the two will fit together only in a single position. The shank and the snugly fitting appliance handle are provided with mound and dimple means, the mound on one fitting into the dimple of the other, but requiring at least a gentle pressure to cause the mound of one to ride over the mound of the other. A small degree of elasticity is given to the device so that the handle of the appliance may be pushed over the shank and snapped in place and so that the attachment of one to the other may be maintained during use.

The elasticity provided comes from the materials used in the construction of the shank and the appliance handle and the unique shaping of the appliance handle whereby the one will yield to the other while the appliance is being pushed home. These two fitting pieces may be constructed of thermoplastic material which while having great strength still has greater elasticity than other conventionally used materials, such as metal. Thus, if one piece is provided with a raised portion herein termed a mound and the other is provided with a correspondingly located depression herein termed a dimple, the one having the dimple will have to ride over the mound until the mound drops down into the dimple. In addition to the nature of the materials used, elasticity is provided by a split construction of the handle of the appliance so that as the handle is being pushed home the two sides thereof will bend outwardly one from the other and part so that the distance between them will increase somewhat. Thus elasticity is provided by compressibility and by sidewise yielding to strain and the result of the two makes it possible to provide a snug fit of the appliance handle over the vibrating shank.

Another feature of the invention is the shape of the shank and the fitting handle of the appliance. The sides of the shank may be described as substantially parallel to the longitudinal axis of the shank but slightly tapered so that a very snug fit of the appliance handle over the shank is provided when the appliance is driven home and the mound and dimple means engage each other.

Other features will appear hereinafter.

The drawings consist of a single sheet having two figures, as follows:

FIG. 1 is a perspective view of a snap-on device, in this showing a toothbrush having a recessed handle adapted to be pushed onto the shank of a power drive handle;

FIG. 2 is an exploded perspective view of the shank of the power drive handle and the snap-on portion of the handle of the device of FIG. 1, which is to be driven by the means contained in the handle terminating in the said shank; and FIG. 3 is a fragmentary perspective view of a modified snap-on handle.

The present invention resides in a peculiarly shaped handle of an appliance which allows the handle, by gentle pressure to be pushed onto a shank and snapped into position whereby any like pressure to remove the appliance less than that used in the first instance will leave the said appliance firmly locked in place. In the drawings, the handle 1 of the device houses power drive means such as an electrical motor and, in some cases, a battery used to vibrate the shank 2 which protrudes from and extends beyond the housing 1. This housing is provided with a flexible apron, not shown, which is fitted into a groove 3 of the shank 2 and serves as a stop to prevent the admission of liquids or moist matter, such as toothpaste, into the means housed in the handle 1.

The shank is an elongated piece whose sides are substantially parallel to the longitudinal axis of the device but are slightly tapered, this aspect being somewhat exaggerated in the drawings for the sake of clarity. The end of the handle 4 of the appliance shown is shaped to fit snugly on the said shank. As shown, the cross section of the shank 2 and the recessed handle 4 of the toothbrush are shaped in such a manner that the toothbrush can only be snapped onto the shank in one position.

The handle of the appliance and the shank are provided with what may be termed mound and dimple means. In the handle of the appliance, the raised portion 5 will constitute a mound and the depressed portion 6 will be a dimple. In the shank the raised portion 7 will constitute a mound while the depressed portion 8 will constitute a dimple. It will at once be apparent that the mound 5 of the appliance will have to be forced over the mound 7 of the shank. In order to facilitate such an operation, the devices are made somewhat elastic so that under gentle pressure these mound means are made to ride one over the other until the mound then snaps into the correspondingly located dimple means.

By way of example, the shank 2 may be constructed of polypropylene or the like, a thermoplastic material of light weight and great strength, employed here to withstand the rigors of the changing stresses to which it is subjected in operation. This material is somewhat elastic and the two oppositely located mounds 7, and its counterpart 9 on the other side of the shank, will yield slightly when the handle 4 of the brush is pushed over the shank 2 towards the handle 1.

The handle 4 is likewise constructed of a commercial thermoplastic material, by way of example cellulose propionate or the like and this too is slightly elastic. Moreover, the handle 4 is split at its end into two pieces 10 and 11 normally held together by the cross piece 12 so that as the mounds ride over each other the pieces 10 and 11 will part slightly thus allowing the desired snap-on operation.

Reference is made herein to my copending application, Serial Number 284,612, filed May 31, 1963, which completely discloses the means housed in the handle 1 used to cause the vibratory motion of the shank 2.

In FIG. 3, there is shown a modification of the toothbrush handle 4, which differs from the structure described above only in the omission of the split separating the two end pieces 10 and 11.

While the invention has been shown in several forms, it will be obvious to those skilled in the art that it is not so limited, but is susceptible of various other changes and modifications without departing from the spirit thereof.

What is claimed is:
1. A toothbrush attachment comprising a handle having laterally extending bristles adjacent one end thereof and a coupling at the other end thereof, said coupling having a trough-shaped recess in a side thereof with an end of the trough opening through the corresponding end of the handle, said trough-shaped recess having an opening through its bottom wall intermediate the ends of said bottom wall, a bridging member secured to the upper free edges of the trough side walls and overlying the opening in the trough bottom wall, and detent means integral with the inner side wall surfaces of the recess between the bridging member and the open end of the trough-shaped recess.

2. Structure as specified in claim 1, wherein the bottom wall of the recess is slotted from the opening therethrough to the open end of the recess.

References Cited by the Examiner
UNITED STATES PATENTS

| | | | |
|---|---|---|---|
| 1,314,044 | 8/19 | Buker. | |
| 1,887,913 | 11/32 | Bell | 287—103 |
| 2,644,475 | 7/53 | Morton | 287—119 |
| 2,668,973 | 2/54 | Glaza et al. | 15—176 |
| 3,072,938 | 1/63 | Phaneuf | 15—176 |
| 3,088,148 | 5/63 | Moret | 15—145 |

CARL W. TOMLIN, *Primary Examiner.*